United States Patent
Stiller et al.

(10) Patent No.: US 10,177,629 B2
(45) Date of Patent: Jan. 8, 2019

(54) METHOD FOR GENERATING ELECTRICAL ENERGY AND ENERGY GENERATION PLANT

(71) Applicant: MITSUBISHI HITACHI POWER SYSTEMS EUROPE GMBH, Duisburg (DE)

(72) Inventors: Christoph Stiller, Fürstenfeldbruck (DE); Sebastian Rehfeldt, Essen (DE); Brian Stöver, Recklinghausen (DE); Alexander Alekseev, Wolfratshausen (DE)

(73) Assignee: Mitsubishi Hitachi Power Systems Europe GMBH, Duisburg (DE)

( * ) Notice: Subject to any disclaimer, the term of this patent is extended or adjusted under 35 U.S.C. 154(b) by 389 days.

(21) Appl. No.: 14/909,816

(22) PCT Filed: Jul. 29, 2014

(86) PCT No.: PCT/EP2014/002075
§ 371 (c)(1),
(2) Date: Feb. 3, 2016

(87) PCT Pub. No.: WO2015/018505
PCT Pub. Date: Feb. 12, 2015

(65) Prior Publication Data
US 2016/0190896 A1    Jun. 30, 2016

(30) Foreign Application Priority Data
Aug. 9, 2013  (EP) ..................................... 13003986

(51) Int. Cl.
*F25J 1/02*    (2006.01)
*H02K 7/18*    (2006.01)
(Continued)

(52) U.S. Cl.
CPC ........... *H02K 7/1823* (2013.01); *F01K 3/004* (2013.01); *F01K 13/02* (2013.01); *F02C 6/16* (2013.01);
(Continued)

(58) Field of Classification Search
CPC ........ H02K 7/1823; F25J 1/023; F25J 1/0251; F25J 1/0264; F25J 1/0012; F25J 1/0037;
(Continued)

(56) References Cited

U.S. PATENT DOCUMENTS 3,731,495 A * 5/1973 Coveney ............... F01K 23/064
                                                  62/651
4,329,842 A * 5/1982 Hoskinson ............ F02C 3/00
                                                  60/39.465
(Continued)

FOREIGN PATENT DOCUMENTS

| EP | 2 604 824 A1 | 6/2013 |
| GB | 2 494 400 A  | 3/2013 |
| JP | H04 132837 A | 5/1992 |

Primary Examiner — Ted Kim
(74) Attorney, Agent, or Firm — William W. Cochran; Cochran Freund & Young, LLC

(57) ABSTRACT

A method for producing electrical energy in a combined energy generation plant which comprises an air treatment unit and a power station unit is proposed. In a first operating mode, air is liquefied to form an air liquefaction product and, in a second operating mode, an air liquefaction product is converted into a gaseous or supercritical state, in which said product is introduced into the power station unit and is used for producing electrical energy. In a third operating mode, air is condensed in the air treatment unit and used in the power station unit directly for producing electrical energy. It is envisaged that, in the first operating mode, the air is cooled to several temperature levels by two liquid coolants and the air liquefaction product is correspondingly heated.

(Continued)

In addition, in the first operating mode, the air is condensed stepwise over several pressure levels.

17 Claims, 9 Drawing Sheets

(51) Int. Cl.
*F01K 3/00* (2006.01)
*F01K 13/02* (2006.01)
*F02C 6/16* (2006.01)
*F25J 1/00* (2006.01)

(52) U.S. Cl.
CPC .............. *F25J 1/004* (2013.01); *F25J 1/0012* (2013.01); *F25J 1/0037* (2013.01); *F25J 1/0042* (2013.01); *F25J 1/0045* (2013.01); *F25J 1/0202* (2013.01); *F25J 1/023* (2013.01); *F25J 1/0228* (2013.01); *F25J 1/0251* (2013.01); *F25J 1/0264* (2013.01); *F25J 2205/24* (2013.01); *F25J 2205/66* (2013.01); *F25J 2210/06* (2013.01); *F25J 2235/02* (2013.01); *F25J 2240/10* (2013.01); *F25J 2240/80* (2013.01); *F25J 2240/82* (2013.01); *F25J 2240/90* (2013.01); *F25J 2270/06* (2013.01); *Y02E 60/15* (2013.01)

(58) Field of Classification Search
CPC .......... F25J 1/004; F25J 1/0228; F25J 1/0045; F25J 1/0202; F25J 1/0042; F25J 2205/24; F25J 2210/06; F02C 6/16; F01K 3/004; F01K 13/02; Y02E 60/15
See application file for complete search history.

(56) References Cited

U.S. PATENT DOCUMENTS

| 4,806,136 | A | * | 2/1989 | Kiersz | ................. | F25J 3/04157 |
| | | | | | | 62/646 |
| 2003/0101728 | A1 | | 6/2003 | Wakana et al. | | |
| 2009/0282840 | A1 | | 11/2009 | Chen et al. | | |
| 2015/0113940 | A1 | * | 4/2015 | Sinatov | ..................... | F01K 3/02 |
| | | | | | | 60/39.182 |

* cited by examiner

METHOD FOR GENERATING ELECTRICAL ENERGY AND ENERGY GENERATION PLANT

CROSS-REFERENCE TO RELATED APPLICATION

This application claims priority under 35 USC § 119 to International Patent Application No. PCT/EP2014/002075, filed on Jul. 29, 2014, which claims priority from European Patent Application EP 13 003 986.0 filed on Aug. 9, 2013.

BACKGROUND OF THE INVENTION

The invention relates to a method for generating electrical energy in a combined energy generation plant that comprises an air treatment unit and a power plant unit, and a corresponding energy generation plant which comprises an air treatment unit and a power plant unit, wherein in a first operating mode, in the air treatment unit, air is successively compressed, cooled and expanded and used for obtaining an air liquefaction product, in a second operating mode, in the air treatment unit, an air liquefaction product is vaporized or pseudo vaporized at superatmospheric pressure and used for obtaining electrical energy in the power plant unit, and in a third operating mode, in the air treatment unit, air is compressed and used in the power plant unit for obtaining electrical energy.

The energy generation plant for generating electrical energy has an air treatment unit combined with a power plant unit, which air treatment unit comprises a compressor arrangement, a heat-exchange system having a coolant system, a liquefaction system and a tank system and is equipped, in a first operating mode to compress air in the compressor arrangement, to cool it in the heat-exchange system and to expand it in the liquefaction system and to use it for obtaining an air liquefaction product, in second operating mode to vaporize or pseudo vaporize an air liquefaction product in the heat-exchange system at superatmospheric pressure and to use it in the power plant unit to obtain electrical energy, and in a third operating mode to compress air in the compressor arrangement and to use it in the power plant unit to obtain electrical energy.

It is known, for example from DE 31 39 567 A1 and EP 1 989 400 A1, to use liquid air or liquid nitrogen, that is to say low-temperature air liquefaction products, for grid control and for providing controlling power in electricity grids.

At cheap electricity times, or electricity surplus times, in this liquefied in an air separation plant with an integrated liquefier or in a dedicated liquefaction plant, here generally termed air treatment unit, in total or in part to give such an air liquefaction product. The air liquefaction product is stored in a tank system using low-temperature tanks. This operating mode is here termed "liquefaction mode".

At peak load times, the air liquefaction product is taken off from the tank system, boosted in pressure by means of a pump and warmed to about ambient temperature or above, and thereby transformed into a gaseous or supercritical state. A high-pressure stream obtained thereby is expanded to ambient pressure in a power plant unit in an expansion turbine or a plurality of expansion turbines with intermediate heating. The mechanical power released in this case is converted into electrical energy in one or more generators of the power plant unit and fed into an electrical grid. This mode of operation is here termed "take off mode".

Corresponding methods and devices can, as can also the method and device of the invention, in principle also operate with an air liquefaction product that contains more than 40 mol % oxygen. However, this has been excluded here in order to avoid confusion with methods and devices in which a particularly oxygen-rich fluid is introduced into a gas turbine to support oxidation reactions.

The cold released on transformation of the air liquefaction product into the gaseous or supercritical state can also be stored during the take off mode and used during the liquefaction mode for providing cold for obtaining the air liquefaction product.

Finally, compressed air storage power plants are also known in which the feed air is not, however, liquefied, but is compressed in a compressor and stored in a subterranean cavern. In times of high electricity demand, the compressed air is passed out of the cavern into the combustion chamber of a gas turbine. At the same time, fuel, for example natural gas, is fed to the gas turbine via a gas line, and burnt in the atmosphere formed by the compressed air. The exhaust gas formed is expanded in the gas turbine, as a result of which energy is generated.

The economic efficiency of corresponding methods and devices is greatly affected by the overall efficiency. The object underlying the invention is to improve corresponding methods and devices in their economic efficiency.

SUMMARY OF THE INVENTION

The invention, against this background, proposes a method for generating electrical energy in a combined energy generation plant that comprises an air treatment unit and a power plant unit, and also a corresponding energy generation plant according to a method for generating electrical energy in a combined energy generation plant which comprises an air treatment unit and a power plant unit, wherein in a first operating mode, in the air treatment unit, air is successively compressed, cooled and expanded and used for obtaining an air liquefaction product, in a second operating mode, in the air treatment unit, an air liquefaction product is vaporized or pseudo vaporized at superatmospheric pressure and used for obtaining electrical energy in the power plant unit, and in a third operating mode, in the air treatment unit, air is compressed and used in the power plant unit for obtaining electrical energy, characterized in that the air in the first operating mode is successively cooled in counterflow against a first liquid coolant and against a second liquid coolant in a heat-exchange system to which the first coolant is fed at a first temperature level and is taken off after heating to a second temperature level, and to which the second coolant is fed in part at a third temperature level and in part at a fourth temperature level and is taken off after heating to a fifth temperature level, in that the air liquefaction product in the second operating mode is successively warmed in counterflow against the second coolant and against the first coolant in the heat-exchange system to which the second coolant is fed at the fifth temperature level and is taken off, after cooling, in part at the fourth temperature level and in part at the third temperature level, and to which the first coolant is fed at the second temperature level and is taken off after cooling at the first temperature level, in that the air in the first operating mode is successively compressed from a first pressure level to a second pressure level, to a third pressure level and to a fourth pressure level, in that the air liquefaction product is warmed in the second operating mode to a fifth pressure level that is beneath the fourth pressure level, and in that the air is compressed in the third operating mode at a first fraction to the third pressure level and at second fraction to the fourth pressure level, or the fifth pressure level, wherein the first fraction and the second fraction are introduced separately from one another into the power plant unit.

The energy generation plant for generating electrical enemy having an air treatment unit combined with a power plant unit, which air treatment unit comprises a compressor arrangement, a heat-exchange system having a coolant system, a liquefaction system and a tank system and is equipped, in a first operating mode to compress air in the compressor arrangement, to cool it in the heat exchange system and to expand it in the liquefaction system and to use it for obtaining an air liquefaction product, in a second operating mode to vaporize or pseudo vaporize an air liquefaction product in the heat-exchange system at superatmospheric pressure and to use it in the power plant unit to obtain electrical energy, and in a third operating mode to compress air in the compressor arrangement and to use it in the power plant unit to obtain electrical energy, characterized in that the energy generation plant is equipped, to cool the air in the first operating mode successively in counterflow against a first liquid coolant and against a second liquid coolant in the heat-exchange system, by feeding thereto the first coolant at a first temperature level and is taken off after it is heated to a second temperature level, and the second coolant is fed in part at a third temperature level and in part at a fourth temperature level and is taken off after it is heated to a fifth temperature level, to warm the air liquefaction product in the second operating mode successively in counterflow against the second coolant and against the first coolant in the heat-exchange system, by feeding thereto the second coolant at the fifth temperature level and, after it is cooled in part at the fourth temperature level and in part at the third temperature level is taken off, and the first coolant is fed at the features of the independent claims. Preferred embodiments are subject matter of the subclaims and also of the description hereinafter.

Before the explanation of the advantages achievable in the context of the present invention, some expressions used in this application will be explained.

A "power plant unit" is here taken to mean a plant or a plant section that is equipped to generate electrical energy. A power plant unit comprises in this case at least one expansion turbine that is coupled to at least one generator. The mechanical power liberated in the expansion of a fluid in the at least one expansion turbine can be converted into electrical energy in the power plant unit.

An "air treatment unit" is here taken to mean a plant that is equipped to obtain at least one "air liquefaction product" from air. It can be in this case, as explained at the outset, an air separation plant that can be equipped to obtain corresponding air fractions, or else only a liquefaction unit of such a plant or a dedicated liquefaction unit. It is sufficient for an air treatment unit for use in the present invention that can obtain a corresponding low-temperature air liquefaction product that is usable as a storage liquid and is transferable to a tank system. An "air separation plant" is charged with atmospheric air and has a distillation column system for separating the atmospheric air into the physical components thereof, in particular into nitrogen and oxygen. For this purpose, the air is first cooled close to the dew point thereof and then introduced into the distillation column system. Methods and devices for low-temperature separation of air are known, e.g. from Hausen/Linde, Tieftemperaturtechnik [low-temperature engineering], $2^{nd}$ Edition 1985, Chapter 4 (pages 281 to 337). In contrast thereto, an "air liquefaction plant" does not have a distillation column system. Furthermore, the structure thereof corresponds to that of an air separation plant with the delivery of an air liquefaction product. Of course, in an air separation plant liquid air can also be generated as a byproduct.

An "air liquefaction product" is any product that can be produced in the form of a low-temperature liquid at least by compression, cooling and subsequent expansion of air. In particular, in the case of an air liquefaction product it can be liquid air, liquid oxygen, liquid nitrogen and/or a liquid noble gas such as liquid argon. The expressions "liquid oxygen" and "liquid nitrogen" also designate in each case a low-temperature liquid that has oxygen or nitrogen, respectively, in an amount that is above that of atmospheric air. Therefore, it need not necessarily be pure liquids having high contents of oxygen or nitrogen. Liquid nitrogen is therefore taken to mean not only pure or substantially pure nitrogen, but also a mixture of liquidized air gases, the nitrogen content of which is higher than that of the atmospheric air. For example it has a nitrogen content of at least 90 mol %, preferably at least 99 mol %.

A "low-temperature" liquid, or a corresponding fluid, air liquefaction product, stream etc. is taken to mean a liquid medium, the boiling point of which is markedly below the respective ambient temperature and is, for example, 200 K or below, in particular 220 K or below. Examples are liquid air, liquid oxygen, liquid nitrogen etc.

A "heat-exchange system" serves for indirect transfer of heat between at least two streams conducted in counterflow to one another, for example a warm compressed-air stream and one or more cold streams, or a low-temperature air liquefaction product and one or more warm streams. A heat-exchange system can be formed from a single, or a plurality of parallel- and/or series-connected heat exchanger sections, e.g. of one or more plate heat exchanger blocks.

A "compressor system" is a device which is equipped for compressing at least one gaseous stream from at least one starting pressure, at which it is fed to the compressor system, to at least one final pressure at which it is taken off from the compressor system. The compressor system in this case forms a structural unit which can have a plurality of "compressor stages" in the form of known piston, screw and/or blade wheel or turbine arrangements (that is to say radial or axial compressor stages). In particular, these compressor stages are driven by means of a shared drive, for example via a shared shaft or a shared electric motor. A plurality of compressor systems, e.g. a main compressor and a booster compressor of an air treatment unit can form together a "compressor arrangement".

An "expansion turbine" that can be coupled via a shared shaft to further expansion turbines or energy converters such as oil brakes, generators or compressor stages, is equipped for expanding a gaseous or at least partially liquid stream. In particular, expansion turbines can be designed for use in the present invention as turbo expanders. In power plant engineering, expansion machines or expansion turbines are frequently denoted as expanders. If one or more expansion turbines designed as turbo expanders are only coupled to one or more compressor stages, for example in the font of radial compressor stages, and optionally mechanically braked, these are however operated without externally supplied energy, for example by means of an electric motor, the expression "booster turbine" is frequently used therefor. Such a booster turbine compresses in this case at least one stream via the expansion of at least one other stream, but without externally supplied energy, for example by means of an electric motor.

A "gas turbine" in the context of the present application is taken to mean an arrangement of at least one combustion chamber and, downstream thereof, at least one expansion turbine (the gas turbine in the narrow sense). In the latter, hot gases from the combustion chamber are work-producingly expanded. A gas turbine can in addition have at least one compressor stage driven by the expansion turbine via a shared shaft, typically at least one axial compressor stage. A part of the mechanical energy generated in the expansion turbine is usually toed to drive the at least one compressor stage. A further part is regularly converted in a generator for generating electrical energy.

As a modification of a gas turbine, a "combustion turbine" only has said combustion chamber and an expansion turbine downstream thereof. A compressor is usually not provided.

A "hot gas turbine", in contrast to a gas turbine, instead of a combustion chamber, has a heater. A hot gas turbine can be constructed as one stage having a heater and an expansion turbine. Alternatively, however, a plurality of expansion turbines, preferably with intermediate heating, can be provided. In each case, a further heater can be provided, in particular downstream of the last expansion turbine. Also the hot gas turbine is preferably coupled to one or more generators for generating electrical energy.

A "heater", in the context of this application, is taken to mean a system for indirect heat exchange between a heating fluid and a gaseous fluid that is to be heated. By means of such a heater, residual heat, waste heat, process heat, solar heat etc., can be transferred to the gaseous fluid that is to be heated and utilized in a hot-gas turbine for energy generation.

A "waste-heat generator" also termed a waste-heat boiler or heat recovery steam generator (HRSG) is equipped for generating steam by heating water, or for further heating, e.g. of cold steam to superheated steam, by means of a waste-heat stream, for example by means of a still hot or reheated gas stream downstream of a gas turbine or hot gas turbine.

A "tank system", in the context of the present application, is taken to mean an arrangement having at least one low-temperature storage tank equipped for storage of a low-temperature air liquefaction product. A corresponding tank system has insulation means.

The present application, for characterization of pressures and temperatures, uses the expressions "pressure level" and "temperature level", which are intended to signify that corresponding pressures and temperatures in a corresponding plant need not be used in the form of exact pressure or temperature values in order to realize the concept according to the invention. However, such pressures and temperatures typically range in certain regions which are, for example, +/−1%, 5%, 10%, 20% or even 50% about a mean value. Corresponding pressure levels and temperature levels can in this case be in disjoint ranges, or in ranges which overlap one another. In particular, for example, pressure levels include unavoidable pressure drops or expected pressure drops, for example on account of cooling effects. The same applies to temperature levels. The pressure levels stated here in bar are absolute pressures.

If low-temperature air liquefaction products or corresponding liquid streams in the context of the present application are "transformed into a gaseous or supercritical state" by heating, this firstly includes a regular phase transition by evaporation if this proceeds at a subcritical pressure. However, if such low-temperature air liquefaction products or corresponding liquid streams are heated at a pressure that is above the critical pressure, during the heating above the critical temperature, a phase transition in the actual sense does not take place, but a transition from the liquid state to the supercritical state takes place, for which here the expression "pseudovaporization" is used.

Advantages of the Invention

In the context of the present invention, a method is proposed for obtaining electrical energy in a combined energy generation plant that comprises an air treatment unit and a power plant unit, in a first operating mode, in the air treatment unit, air is successively compressed, cooled and expanded and used for obtaining an air liquefaction product. The air liquefaction product is preferably stored in a tank system. In addition to the generation of the air liquefaction product in the first operating mode, an externally provided air liquefaction product can also be transferred to a corresponding tank system, for example from a separate air treatment unit.

In a second operating mode, in the air treatment unit, an air liquefaction product is vaporized or pseudo vaporized at superatmospheric pressure, that is to say converted into a gaseous or supercritical state, and used for obtaining electrical energy in the power plant unit.

"To use" a vaporized or pseudo vaporized air liquefaction product "to obtain electrical energy" comprises, for example, expanding a corresponding pressurized stream present at superatmospheric pressure in gaseous or supercritical state and/or a pressurized stream derived therefrom in at least one expansion turbine coupled to a generator and to obtain hereby electrical energy. A "derived" stream can be obtained from the pressurized stream in this case by mixing or combining with at least one further stream and/or by at least partial chemical reaction of at least one component of the pressurized stream, for example in the form of a combustion reaction, as explained hereinafter with reference to the use of a corresponding pressurised stream in a gas turbine or combustion turbine. Typically, only a part of the pressurized stream and/or of the pressurized stream derived therefrom, for example 4 to 5%, is chemically reacted with a fuel by the combustion in the combustion chamber, i.e. the fuel is reacted in the combustion chamber with a markedly superstoichiometric amount of the collected stream or of the oxygen present therein.

These two modes of operation that are explained, as already mentioned at the outset, permit air to be liquefied to provide an air liquefaction product at cheap electricity times or times of surplus electricity, and to take off this air liquefaction product from the tank system at peak load times. The method permits in this ease effective utilization of electrical energy that is present expediently or in surplus and intermediate storage thereof. The method according to the invention can in this case also be used, for example, for energy sources that are available only temporarily for generating electrical energy.

In a third operating mode, in the air treatment unit, air is compressed and used in the power plant unit for obtaining electrical energy. The air in this case is not liquefied directly in the third operating mode, but is transferred directly under pressure into the power plant unit. The third operating mode permits an operation of a corresponding energy generation plant even when, for example, no air liquefaction product is available, although at first sight it appears to be disadvantageous, in the third operating mode, first to compress air and then to expand it in the power plant unit, and thereby to recover the electrical energy previously invested, the utilization of a corresponding plant can be improved overall by these measures, because, as a result of the third operating mode, the hardware components present can be utilized more effectively. A plurality of these hardware components, for example heat exchangers and pumps, in this case, are used not only in the first operating mode, but also in the second operating mode. They can also be used in the third operating mode. The third operating mode thereby permits, in particular, an uninterrupted operation of a multiplicity of plant components that appears to be particularly expedient in the overall view. The plant components can be operated continuously and in a material-sparing manner.

The first operating mode in the context of the present application is also termed, as mentioned, "liquefaction mode". The second operating mode in the context of the present application is also termed "take off mode". The third operating mode in which compressed air is transferred directly from the air treatment unit to the power plant unit in the context of the present application is also termed "direct mode".

According to the invention it is provided that, in the first operating mode, to cool the air that is used for obtaining the air liquefaction product, successively in counterblow against a first liquid coolant and against a second liquid coolant from a corresponding coolant system in a heat-exchange system. To the heat-exchange system which, for this purpose, as explained hereinafter, can have in particular two heat-exchange blocks, is fed the first coolant at a first temperature level and, after heating (i.e. partial transfer of the cold thereof to the air), is taken off at a second temperature level. The second coolant is fed to the heat-exchange system, in part at a third temperature level and in part at a fourth temperature level and is taken off, after heating, at a fifth temperature level.

The air liquefaction product is heated in the second operating mode in the opposite manner, i.e. successively conducted in counterflow against the second coolant and against the first coolant in the heat-exchange system. The second coolant is then fed to the heat-exchange system at the fifth temperature level and, after cooling (i.e. uptake of cold from the air liquefaction product), is taken off from the heat-exchange system in part at the fourth temperature level and in part at the third temperature level. The first coolant is fed to the neat-exchange system at the second temperature level and, after corresponding cooling, is taken off at the first temperature level. Examples of corresponding temperature levels are stated hereinafter:

first temperature level ($T1$): 20 to 50° C.
second temperature level ($T2$): −100 to −70° C.
third temperature level ($T3$): −100 to −70° C.
fourth temperature level ($T4$): −140 to −100° C.
fifth temperature level ($T5$): −180 to −150° C.

The second temperature level and the third temperature level can also correspond to one another in the context of the present invention.

According to the invention, therefore, two liquid coolants are used for cooling the air and for heating the air liquefaction product. In this case, they can be, for example, liquid or liquefied coolants such as low-grade alcohols and/or saturated or halogenated hydrocarbons such as, e.g., propane. The first coolant in this case advantageously has a higher boiling point than the second coolant and is therefore also termed "warm" coolant. The second coolant on account of its lower boiling point is also termed "cold" coolant.

Using appropriate coolants, the heat-exchange diagram of a heat-exchange system used can be arranged particularly expediently. The two liquid coolants differ in their chemical composition and in particular in their boiling point. As first liquid coolant, in particular methanol (usage range to −95° C.) is used, and as second liquid coolant, in particular liquefied propane (usage range to −170° C.). By using the two liquid, coolants which take up sensible heat during the cooling of a corresponding air stream, a storage capacity for cold is available.

The coolants for use in the invention are therefore selected in particular on the basis of the respective boiling point. This must be selected in such a manner that the coolant is liquid in the respective entire working range.

As first (warm) coolant, in addition to methanol and propane, furthermore the low-grade alcohols listed in the table hereinafter are used. Also suitable are aromatics such as, for example, toluene.

As second (cold) coolant, in contrast, for example alkanes and alkenes such as ethane, ethylene, propane, propylene, butane, pentane, hexane etc., and/or their chlorinated and/or fluorinated derivatives (CFC) can be used. Mixtures of such substances can likewise be used.

| Name | Melting point in ° C. | Boiling temperature in ° C. |
|---|---|---|
| Methanol | −97.8 | 64.7 |
| Ethanol | −114.1 | 78.3 |
| Propan-1-ol | −126.2 | 97.2 |
| Butan-1-ol | −89.3 | 117.3 |
| Pentan-1-ol | −78.2 | 138 |
| Hexan-1-ol | −48.6 | 157.5 |
| Propan-2-ol | −88.5 | 82.3 |
| Butan-2-ol | −114.7 | 99.5 |
| 2-methylbutan-1-ol | −108 | 108 |
| Pentan-2-ol | −50 | 118.9 |
| 2-methylbutan-1-ol | −70 | 129 |
| 3-methylbutan-1-ol | −117 | 130.8 |
| 1,2-propanediol | −68 | 188 |
| Butane-1,2-diol | −114 | 192 |
| Butane-1,3-diol | Below −50 | 207.5 |
| Prop-2-en-1-ol | −129 | 97 |
| Pentan-1-ol | −78.2 | 128.0 |

During the cooling and heating, both coolants remain liquid. Cold stored in the air liquefaction product is thereby transferred so the two coolants at a plurality of temperature levels and is again available for generating the liquefaction product in the first operating mode. In contrast to the otherwise usual vaporization or pseudovaporization of a corresponding liquefaction product against a heat carrier such as atmospheric air or hot steam, the cold of liquefaction from the air liquefaction product is not lost or is not completely lost. At the same time, the number of hardware components such as heat exchangers, turbines and/or compressors is reduced, the costs of the entire energy generation plant are decreased and the economic efficiency is increased.

Of course, one or more other coolants can also be used in the invention. The heat-exchange diagram can be further optimized thereby; however, the expenditure in terms of apparatus and control technology also becomes higher. The heating and cooling of the coolants in this case is carried out in the heat-exchange system of the air treatment plant which is present in any case for cooling the air in the first operating mode and heating the liquefaction product in the second operating mode.

It is particularly advantageous to feed the second coolant in the first operating mode to the heat-exchange system in the form of substreams at the third temperature level and at the fourth temperature level and to take it off in the form of a collected stream at the fifth temperature level. The substreams in this case are combined in the heat-exchange system to form the collected stream.

Correspondingly, the second coolant, in the second operating mode, is advantageously fed to the heat-exchange system in the form of a collected stream at the fifth temperature level, and taken off at the third temperature level in the form of substreams at the fourth temperature level. The division of the collected stream into the substreams is also performed in this case in the heat-exchange system, wherein the collected stream and the substreams in the first and second operating mode are advantageously conducted through the same passages of the heat-exchange system.

It can be particularly advantageous to conduct in each case a stream of a non-condensing gas through the heat-exchange system in counterflow to the first coolant and to the second coolant. A corresponding non-condensing gas, for example nitrogen, can in this case blanket the respective coolant in corresponding coolant tanks and be used for pressurization.

The first liquid coolant in the first operating mode is therefore preferably carried out in the same passage groups of the heat-exchange system in which the first liquid coolant is cooled in the second operating mode. The same applies to the second liquid coolant. The same apparatus can thereby be used in both modes of operation. Similarly thereto, the same pumps can be used in the first and second operating modes, in each case one for the transport of the first liquid coolant and one for the transport of the second liquid coolant.

The first coolant is advantageously pumped back and forth between two coolant tanks (a "cold" coolant tank at the first temperature level and also a "warm" coolant tank at the second temperature level) using a corresponding pump system. During the first operating mode, the first liquid coolant in this case is pumped out of the cold coolant tank to the warm coolant tank, and vice versa in the second operating mode.

The second coolant is likewise pumped back and forth between three, more precisely between one and two other, coolant tanks (a "cold" coolant tank at the third temperature level, a "temperature-maintained" coolant tank at the fourth temperature level and a "warm" coolant tank at the fifth temperature level), likewise using a corresponding pump system. During the first operating mode, the second coolant is in this case taken off from the cold coolant tank and the temperature-maintained coolant tank in the form of two substreams and fed to the heat-exchange system. After heating and optionally combining to form a collected stream, the second coolant is transferred to the warm coolant tank. In the second operating mode, the second coolant is taken off from the warm coolant tank as a collected stream and fed to the heat-exchange system. There, the collected stream is cooled and divided into the two substreams. The second coolant passes through the heat-exchange system in this case via differing heat-exchange sections and is therefore cooled differently (to the fourth temperature level and the third temperature level). The corresponding substreams are then, in the second operating mode, transferred to the temperature-maintained coolant tank and the cold coolant tank.

A further central aspect of the present invention is the stepwise compression of the air in the first operating mode and the third operating mode and feeding the air at different pressures into the power plant unit in the third operating mode. This proceeds in such a manner that the compression of the air used in the first operating mode for obtaining the air liquefaction product proceeds successively from a first pressure level first to a second pressure level, thereafter to a third pressure level and finally to a fourth pressure level. The air liquefaction product is heated in the second operating mode in particular to a fifth pressure level which is below the fourth pressure level. At least the fourth or fifth pressure level can be at supercritical pressure.

In the context of the present invention, in this case, in particular the pressure levels stated hereinafter are used:
first pressure level (LP): 0 to 2 bar, in particular 1.4 bar
second pressure level (MP): 4 to 8 bar, in particular 5.6 bar
third pressure level (MP1): 12 to 50 bar, in particular 17 bar
fourth pressure level (HP): 50 to 100 bar, in particular 85 bar
fifth pressure level (HP1): 50 to 100 bar, in particular 65 bar Finally, in the third operating mode, a first fraction of the air used for obtaining the electrical energy is compressed to the third pressure level, and a second fraction is compressed to the fourth pressure level or to the fifth pressure level. The first and second fractions in this case are transferred separately from one another to the power plant unit. This permits a particularly effective operation of a corresponding energy generation plant in the third operating mode because in this case corresponding pressure stages of a power plant unit can be operated particularly efficiently. Only a part of the air used need actually be conducted through the booster. The main compressor can be operated with a higher compressor output and deliver a greater amount of air. The air need not be completely boosted, but can in part also be transferred directly to the power plant unit.

In the context of the present invention, the power plant unit is operated in the second operating mode and in the third operating mode, wherein in the second operating mode the air liquefaction product that is heated under pressure and converted into the gaseous or supercritical state, is conducted, preferably at supercritical pressure, through a combustion chamber in the power plant unit, in which a fuel is burnt. An exhaust gas from the combustion chamber is fed at the third pressure level according to a first embodiment to an expansion turbine coupled to a generator. This is therefore generation of electrical energy by means of a combustion turbine or a gas turbine.

It can also be provided that, in the second operating mode, the air liquefaction product that is heated under pressure in the air treatment unit and converted into the gaseous or supercritical state in the power plant unit before conduction though the combustion chamber at the fifth pressure level is fed to a further expansion unit coupled to a generator. Advantageously, the exhaust gas of a combustion chamber is also used correspondingly downstream of the expansion unit, for example is fed to a waste-heat steam generator and there used for generating steam.

In each case, a hot gas turbine, as explained at the outset, can be used. This can be used instead of a gas turbine or combustion turbine. In particular, one of the air fractions which is compressed in the third operating mode at a first fraction to the third pressure level and at a second fraction to the fourth pressure level or to the fifth pressure level, can in this case be boosted in pressure by heating.

For the heating, for example waste heat and/or solar heat can be used. A corresponding heating can also obviously proceed with respect to the air liquefaction product that, under pressure, is heated and converted to the gaseous or supercritical state in the air treatment unit in the second operating mode.

To decrease or make symmetrical an axial load or a generator used in the context of the invention, said generator can also be constructed with an axis or shaft which is equipped with expansion turbines arranged on both sides of the generator. Via such a symmetrical arrangement, a one-sided loading of a generator is reduced. It is particularly advantageous in this case to divide the collected stream or the stream derived therefrom, for example upstream or downstream of a heater and/or a combustion chamber, into two or more substreams, of which each is expanded in an expansion turbine coupled to a shared generator.

The present explanations relate in the same manner to an energy generation plant which has means for carrying out the above described method. A corresponding energy generation plant is in particular equipped for carrying out a corresponding method.

The invention and preferred embodiments of the invention are described in more detail in the accompanying figures.

DETAILED DESCRIPTION OF THE DRAWINGS

In the figures, elements corresponding to one another tear identical reference signs. Repeated explanation is dispensed with for the sake of clarity. All figures show here plant diagrams of energy generation plants, or parts thereof, in highly simplified, schematic depiction. In this case, in part different operating modes (cf. FIGS. 1A, 2A, 3A and 4A, compared with FIGS. 1B, 2B, 3B and 4B, and FIGS. 1C and 4C, respectively) are shown in comparison to one another. These operating modes differ, inter alia, in the connection of a multiplicity of valves provided in a corresponding plant. The valves are not shown individually. This relates in particular to valves connected in the open (passing) mode. Lines or inactive streams that are blocked by corresponding valves are, however, shown crossed (-x-).

Figure 1A:
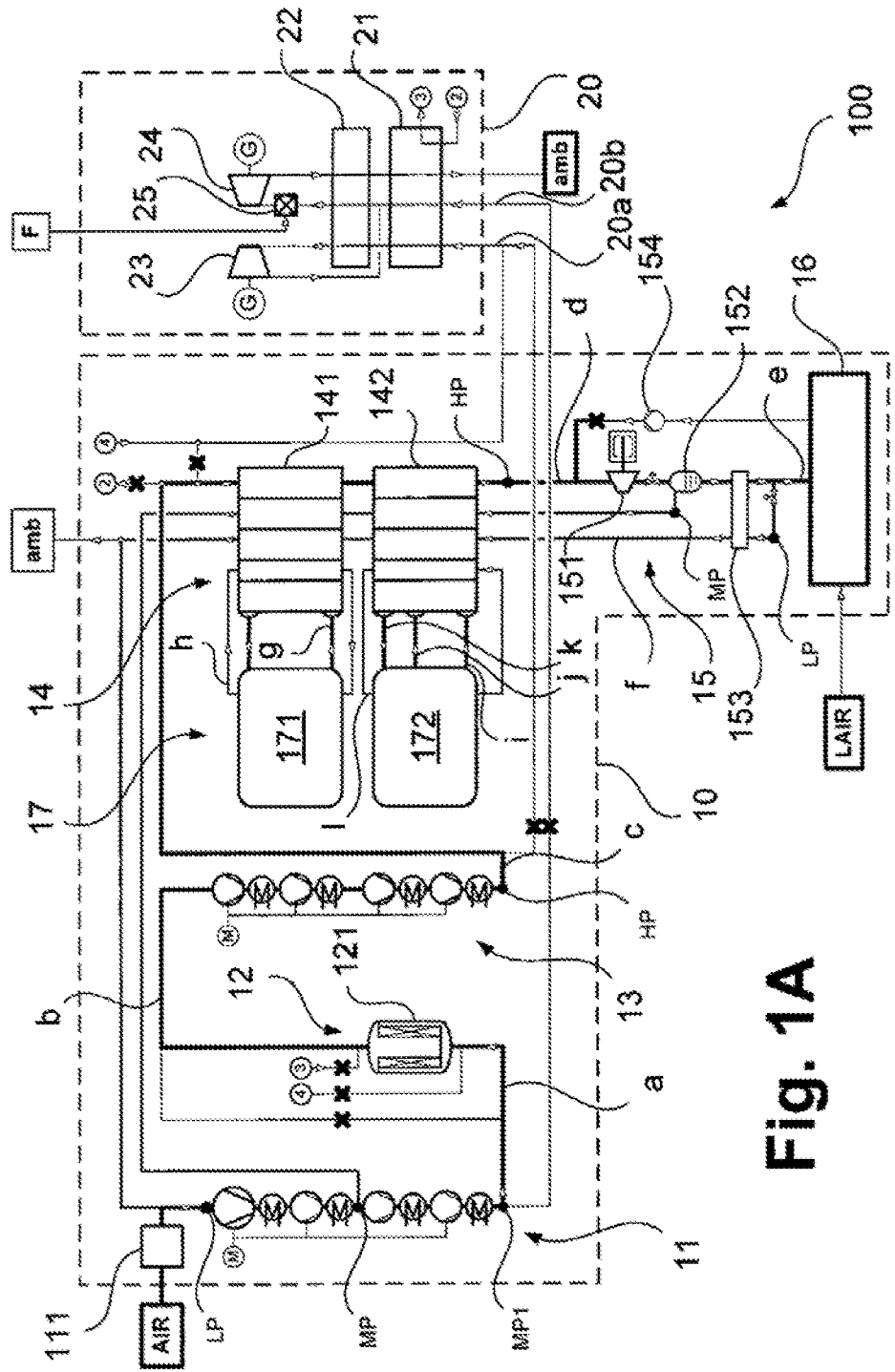
FIG. 1A shows an energy generation plant according to an embodiment of the invention in a first operating mode.

FIG. 1A shows an energy generation plant according to an embodiment of the invention in a first operating mode. This first operating mode corresponds here to the liquefaction mode already previously explained many times, "Liquefaction mode" is taken to mean here that in the first operating mode a certain amount of a low-temperature liquefaction product is generated from air and stored in a tank system. A "liquefaction mode", however, does not mean that the air liquefaction product is exclusively provided by a corresponding energy generation plant. Rather, a corresponding tank system can also in part be filled by an externally supplied low-temperature air liquefaction product, in particular when the capacity of the energy generation plant for generating the entire requirement thereof of a corresponding air liquefaction product is insufficient.

The energy generation plant shown in FIG. 1A comprises components of an air treatment unit, which are depicted enclosed by dashed lines and denoted overall, by 10, and also components of a power plant unit that are depicted enclosed by dashed lines and are denoted overall by 20. The energy generation plant is designated overall by 100.

In the energy generation plant 100, or the air treatment unit 10 thereof, ambient air AIR is taken in by suction via a filter 111 by a main compressor system 11. At the entrance of the main compressor system, the air AIR is at a first pressure level LP of typically 0 to 2 bar, for example 1.4 bar.

The main compressor system 11 can have, in particular, a plurality of compressor stages (not shown in more detail) that can be driven via a shared compressor drive M, or a shared shaft. A main compressor system 11 can, in addition, comprise means for intercooling and aftercooling of a stream that was correspondingly compressed stepwise. Between the compressor stages, where further streams can also be fed, the air AIR is at a second pressure level MP of typically 4 to 8 bar, for example 5.6 bar. The main compressor system 11, overall, is equipped for compressing the air AIR to a third pressure level MP1 of typically 12 to 50 bar, for example 17 bar, at the outlet thereof.

A stream a compressed to the third pressure level MP1 is transferred to a purification system 12 which can have, for example, an absorber container 121 filled with a suitable absorber material. The absorber container 121 can be regenerated cyclically, which is also illustrated in the following FIGS. 1B and 1C. A correspondingly purified stream b is then fed to a booster compressor system 13 and there compressed to a still higher fourth pressure level HP of typically 50 to 100 bar, for example 85 bar. The booster compressor system 13 can also have a plurality of compressor stages that are driven by means of a shared compressor drive M.

The stream c that is boosted in pressure is fed to a heat-exchange unit 14 that, in the example shown, comprises a first heat-exchange block 141 and a second heat-exchange block 142. The stream c in this case is conducted first through the first heat-exchange block 141 and then through the second heat-exchange block 142. After the cooling in the heat-exchange system 14, a correspondingly cooled stream d is present. This is substantially still at the fourth pressure level HP, wherein pressure drops, line losses and the like due to the cooling acre taken into account.

The cooled stream d is then fed to an expansion appliance 151 which, for example, can comprise an oil-braked expansion turbine. The expansion appliance 151 is part of a liquefaction system 15. In the expansion appliance 151, the stream d is expanded to a lower pressure level, for example to the second pressure level MP. The stream d in this case can additionally also be expanded using a valve which is not shown in more detail.

The expanded stream d, after the expansion, is transferred to a separation vessel 152 in which a liquid fraction separates off on the sump side. From the top of the separation vessel 152, a gaseous fluid (without designation) can be taken off. Since said gaseous fluid is at the second pressure level MP, it can be heated in the heat-exchange blocks 142 and 141 of the heat-exchange system and be fed again to the main compressor system 11 at an intermediate point.

From the sump of the separation vessel 152, a liquid fraction, that is to say an air liquefaction product of the air AIR, here liquid air LAIR, is separated off and conducted through a subcooler 153. On the exit side of the subcooler, a low-temperature liquid stream e is obtained thereby, which can be transferred into a tank system 16 having a low-temperature tank. As explained, a further liquefaction product, for example liquid air LAIR, can be supplied externally to the tank system 16.

The subcooler 153 can be operated with a substream of the low-temperature liquid stream e chat is expanded to the first pressure level LP and conducted in counterflow through the subcooler 133. A stream f that is obtained correspondingly, can then be heated in the heat-exchange blocks 142 and 141 of the heat-exchange system 14 and, for example, be delivered to the surroundings amb. The stream f can again be fed to the main compressor system 11 upstream of the main compressor system 11.

For maintaining the temperature of the first heat-exchange block 141 and the second heat-exchange block 142 of the heat-exchange system 14, a coolant system 17 is provided that comprises a first coolant subsystem 171 and a second coolant subsystem 172. The first coolant subsystem 171 and the second coolant subsystem 172 of the coolant system 17 are explained in more detail with reference to FIGS. 2A to 3B hereinafter. It may be pointed out already at this point that by means of the first coolant subsystem 171 in the first operating mode, as shown in FIG. 1A, a coolant stream g of a first liquid coolant from the first coolant subsystem 171 is conducted through the first heat-exchange block 141 from the cold end to the warm end. The coolant stream g of the first coolant heats up hereby from the first temperature level T1 (see above) to the second temperature level T2 and cools in counter flow to the warm stream c. A gaseous stream h is conducted in counterflow to the coolant stream g of the first coolant from the first coolant subsystem 171, which stream h is a non-condensing gas blanketing the first coolant in corresponding coolant tanks of the first coolant subsystem 171.

A stream i and a stream j of a second liquid coolant are fed from the second coolant subsystem 172 to the second heat-exchange block 142 of the heat-exchange system 14 at the cold end thereof (at the third temperature level T3) and at an intermediate point (at the fourth temperature level T4). The streams i and the stream j of the second coolant are combined in the second heat-exchange block 142, heated before, or thereafter, and taken off as stream k from the second heat-exchange block 142 at the warm end thereof. The second coolant heats up hereby to the fifth temperature level T5. Again, a stream l is a non-condensing gas that blankets the second coolant i in corresponding storage tanks.

In the first operating mode shown in FIG. 1A, the power plant unit 20 of the energy generation plant 100 is not in operation or is only driven by means of externally supplied media. It is therefore explained in the figures hereinafter.

Figure 1B:
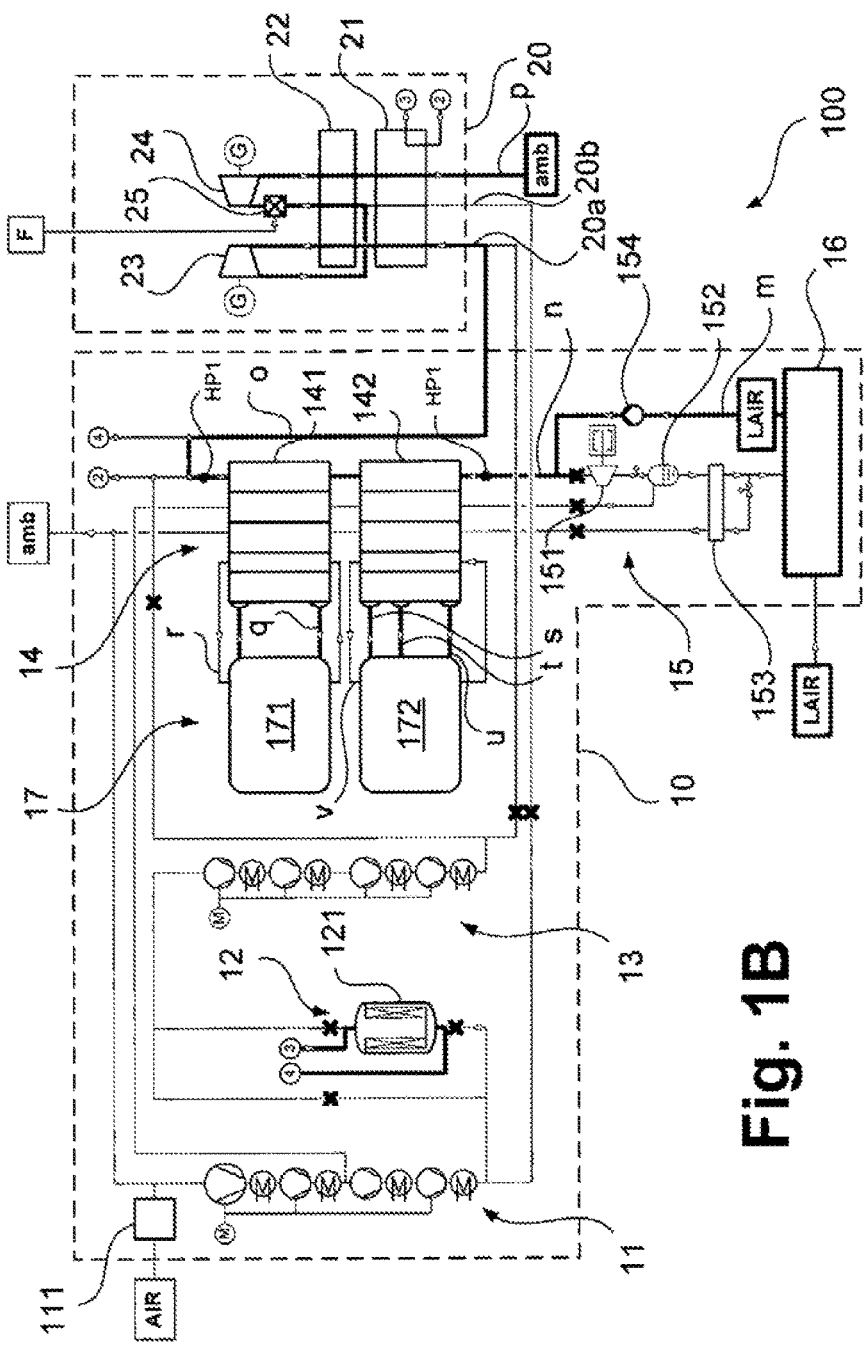
FIG. 1B shows the energy generation plant of FIG. 1A in a second operating mode.

FIG. 1B shows the energy generation plant 100 in a second operating mode. In this case, it is the repeatedly explained takeoff mode, wherein, a "takeoff mode" is taken to mean an operating mode in which no air is fed to the energy generation plant 100, but rather an air liquefaction product is only taken off from a tank system 16. In the takeoff mode, as shown in FIG. 1B, no air is taken in by suction by means of the main compressor system 11. The purification system 12 is in regeneration, wherein a heated stream (cf. links 3 and 4 and explanations given below on the heat exchanger 21 of the power plant unit 20) flows therethrough in counterflow to the air conducted in the first operating mode (cf. FIG. 1A) through a corresponding adsorber vessel 121 and thereby dissolves adsorbed components from the adsorber vessel. A corresponding regeneration stream can then be fed again downstream into the air treatment unit 10 or the power plant, unit 20 (cf. stream o downstream of the first heat-exchange block 141 in this figure).

In the second operating mode shown in FIG. 1B, a stream m of a low-temperature liquefaction product, here liquid air LAIR, is taken off from the storage tank 16. The stream m is brought to pressure in the liquid state by means of a pump 154. Downstream of the pump 154, a corresponding stream n is present at a fifth pressure level HP1 of typically 50 to 100 bar, for example a pressure of 65 bar. The stream n is then, in the heat-exchange system 14, i.e. successively in the second heat-exchange block 142 and the first heat-exchange block 141, converted into a gaseous or supercritical state, that is to say vaporized or pseudo vaporized. In the example shown, the stream n is typically converted at a supercritical pressure into a supercritical state, that is to say pseudo vaporized. The resultant stream o is taken off from the first heat-exchange block 141 at the warm end thereof. At this point, for example, a substream can be branched off and later returned (cf. links 2 and 4), which, after heating in the subsequently explained heat exchanger 21 (cf. links 2 and 3), can be used as regeneration gas in the purification system 12 (cf. links 3 and 4).

The coolant system 17, in the second operating mode of the energy generation plant 100, which is shown in FIG. 1B, is operated in the opposite manner to the first operating mode which is shown in FIG. 1A. This means that by means of the first coolant subsystem 171, a coolant stream q of the first coolant is conducted through the first heat-exchange block 141 from the warm end to the cold end (a corresponding gas stream r is conducted in counterflow thereto) and is therefore cooled from the second temperature level T2 to the first temperature level T1. A coolant stream s of the second coolant subsystem 172 is fed to the second heat-exchange block 142 at the warm end thereof (at the fifth temperature level T5). This is divided. The resultant substreams t and u are taken off from the second heat-exchange block 142 at different colder temperatures, i.e. at the fourth temperature level T4 and at the third temperature level T3. Owing to the explained conduction of the first and second coolants from the first and second coolant subsystems 171 and 172, respectively, in the first heat-exchange block 141, and the second heat-exchange block 142, these can be cooled in counterflow to the stream n. The use of the coolant 17 thereby permits the storage of the cold that is liberated in the vaporization or pseudovaporization of the stream n.

The stream o can be passed out of the air treatment unit 10 at the corresponding pressure, i.e. at the fifth pressure level HP1, and transferred to the power plant unit 20. The power plant unit 20, in the example shown, has at least two fluid intakes 20a and 20b, wherein the stream a in the second operating mode shown in FIG. 1B is fed to the fluid intake 20a. In the second operating mode shown in FIG. 1B, the fluid intake 20b is inactive, or is not operated in the second operating mode.

The stream o is conducted through a heat exchanger 21 of the power plant unit 20 and there heated in counterflow to exhaust gas of a subsequently explained gas turbine unit. In the heat exchanger 21, regeneration gas for the purification system 12 can also be heated, as stated above (cf. links 2 and 3). After the heating in heat exchanger 21 of the power plant unit 20, the stream o is expanded in an expansion turbine 23 which is coupled to a generator G. The expanded stream o can then be heated in a further heat exchanger 22 and conducted through a combustion chamber 25. In the combustion chamber 25, a suitable fuel F, for example natural gas, is burnt in the gas atmosphere formed by the stream o. Of course, farther streams, for example an oxygen-enriched stream, can also be fed at this site. Owing to the combustion of the fuel F in the combustion chamber 25, the volume of the stream o is increased, that is to say a stream derived from the stream o is formed. Said derived stream can be fed to an expansion turbine 24 which can likewise be coupled to a generator G. Optionally, the expansion turbines 23 and 24 can also be coupled to a shared generator G. Electrical energy is generated in the generators G by the expansion in the expansion turbines 23 and 24.

The gas which is still warm after the expansion in the expansion turbine 24 can be used in the heat exchangers 22 and 21 as stream p for heating the previously explained stream o. The correspondingly cooled stream p is blown off to the atmosphere amb, optionally after further purification steps.

Figure 1C:
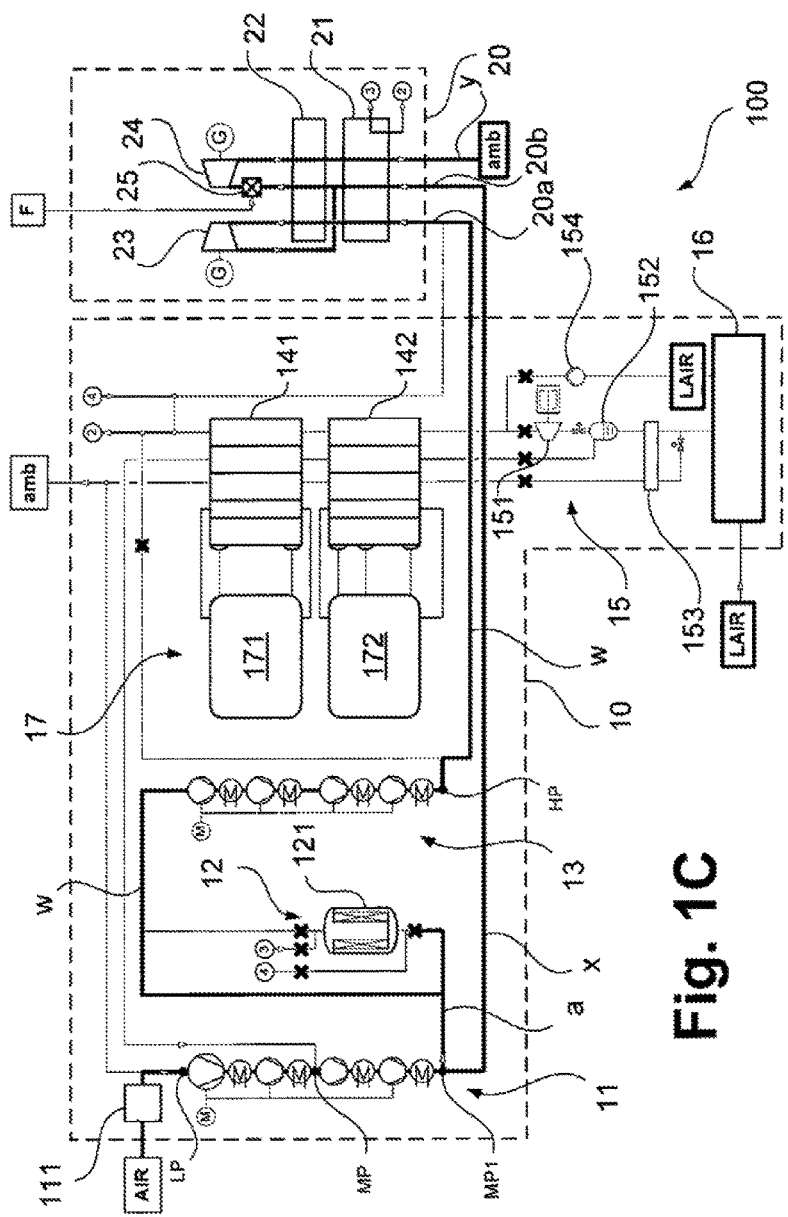
FIG. 1C shows the energy generation plant of FIG. 1A in a third operating mode.

FIG. 1C snows the energy generation plant of the previously explained FIGS. 1A and 1B in a third operating mode. This third operating mode is, as explained, shown in the context of this application as direct operation. The expression "direct operation" means in this case that streams that are compressed in the main compressor system 11 and in the booster compressor system 13, here designated w and x, are transferred at the corresponding pressure levels, namely the third pressure level MP1 (stream x) and the fourth pressure level HP (stream w) directly to the power plant unit 20. This direct operation permits an operation of the energy generation plant 100, even when the heat-exchange system 14 and/or the liquefaction system 15 are not in operation and thus no corresponding stream o (cf. FIG. e 1B) is available.

In the third operative mode shown in FIG. 1C, both fluid intakes 20a and 20b of the power plant unit are charged, more precisely with the streams w and x that have the corresponding pressures. The stream w at the fourth pressure level HP is then first conducted through the expansion turbine 23 and then combined at a correspondingly reduced pressure level with the stream x at the third pressure level MP1. A collected stream obtained hereby is conducted through the combustion chamber 25 and through the expansion turbine 24.

In all of the operating states of FIGS. 1A to 1C, additional fluid can be fed to the tank system 16, in particular when the air liquefaction product generated in the first operating mode, which is shown in the FIG. 1, is not sufficient for filling the tank system 16 or for covering the requirement of fluid in the second operating mode.

Figure 2A:
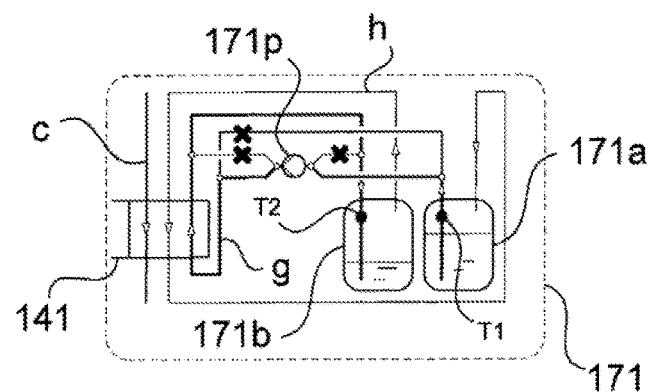
FIG. 2A shows a first coolant subsystem according to an embodiment of the invention in the first operating mode.
Figure 2B:
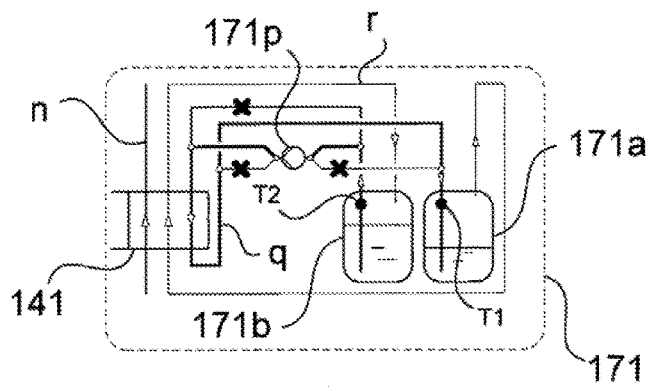
FIG. 2B shows the coolant subsystem of FIG. 2A in the second operating mode.

In FIGS. 2A and 2B, the first coolant subsystem 171 of the coolant system 17 is shown respectively in the first and second operating modes (cf. FIGS. 1A and 1B). FIG. 2A shows the first operating mode, FIG. 2B shows the second operating mode.

The first coolant subsystem 171 comprises a first (cold) coolant tank 171a and a second (warm) coolant tank 171b. In the first and second coolant tanks 171a and 171b, the coolant used is present in each case in liquid form and is blanketed with a corresponding non-condensing gas in order to ensure sufficient pressurization of the coolant. The non-condensing gas can be, for example, nitrogen. In addition, a pump 171p is provided.

Owning to the interconnection shown in FIG. 2A of the lines, which are not shown furthermore in more detail, of the first coolant subsystem 171 in the first operating mode, the previously explained coolant stream g of the first coolant is generated from the first coolant subsystem 172, i.e. corresponding coolant at the first temperature level T1 is conducted from the first coolant tank 171a of the first coolant subsystem 171 through the first heat-exchange block 141 of the neat-exchange system 14, heated there, and transferred at the second temperature level T2 to the second coolant tank 171b of the first coolant subsystem 171. The stream c can be cooled thereby.

FIG. 2B shows the opposite operation of the first coolant subsystem 171, as is implemented in the second operating mode. In this case, as explained, a stream n is vaporized or pseudo vaporized in the first neat-exchange block 141. For this purpose, a corresponding coolant stream q of the first coolant is generated in the first coolant subsystem 171 by transferring coolant from the second coolant tank 171b to the first coolant tank 171a by means of the pump 171p. The gaseous stream r runs in counterflow thereto.

Figure 3A:
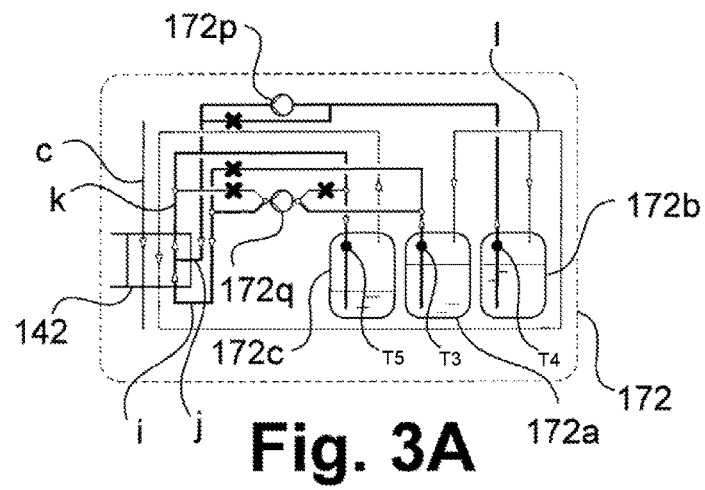
FIG. 3A shows a second coolant subsystem according to an embodiment of the invention in the first operating mode.
Figure 3B:
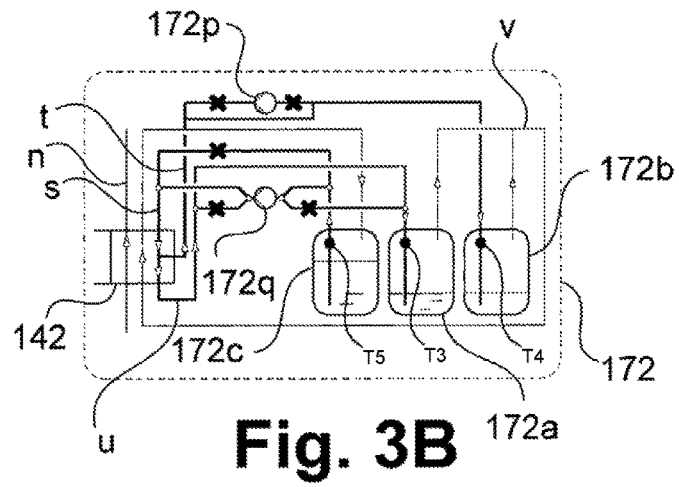
FIG. 3B shows the coolant subsystem of FIG. 3A in the second operating mode.

FIGS. 3A and 3B show correspondingly the second coolant subsystem 172 of the coolant system 17. In the second coolant subsystem 172, three coolant tanks, a first (cold) coolant tank 172a, a second (temperature-maintained) coolant tank 172b, and a third (warm) coolant tank 172c, are provided. These are equipped for storing a second coolant at differing temperatures (first coolant tank 172a: third temperature level T3, second coolant tank 172b: fourth temperature level T4, third coolant tank 172c: fifth temperature level T5). For conducting the second coolant of the second coolant subsystem 172 through the second heat-exchange block 142 of the neat-exchange system 14, two pumps 172p and 172q are provided in the example shown.

The interconnection of the pumps 172p and 172q, and of the lines connected thereto, results directly from the depiction of FIGS. 3A and 3B. In the manner shown, in the first operating mode (FIG. 3A), the streams or substreams of the second coolant i, j and k, and the stream l of the non-condensing gas that also blankets the second coolant here in the coolant tanks 172a to 172c are generated. Correspondingly, in the second operating mode (FIG. 3B) the streams and substreams of the second coolant s, t, u and the stream of the son-condensing gas v are generated. The stream c and the stream n to be vaporized or pseudo vaporized are likewise given.

Overall, by using the coolant system 17 and the heat-exchange system 14, an energetically expedient cooling and heating of streams c and n, respectively, may be achieved. In this case, the first coolant in the first coolant tank 171a of the first coolant subsystem 171 has a lower temperature than the first coolant in the second coolant tank 171b of the first coolant subsystem 171. In the second coolant subsystem 172, the temperature of the second coolant in the first coolant tank 171a is lowest, higher in the second coolant tank 171b and still higher in the third coolant tank 171c.

Figure 4A:
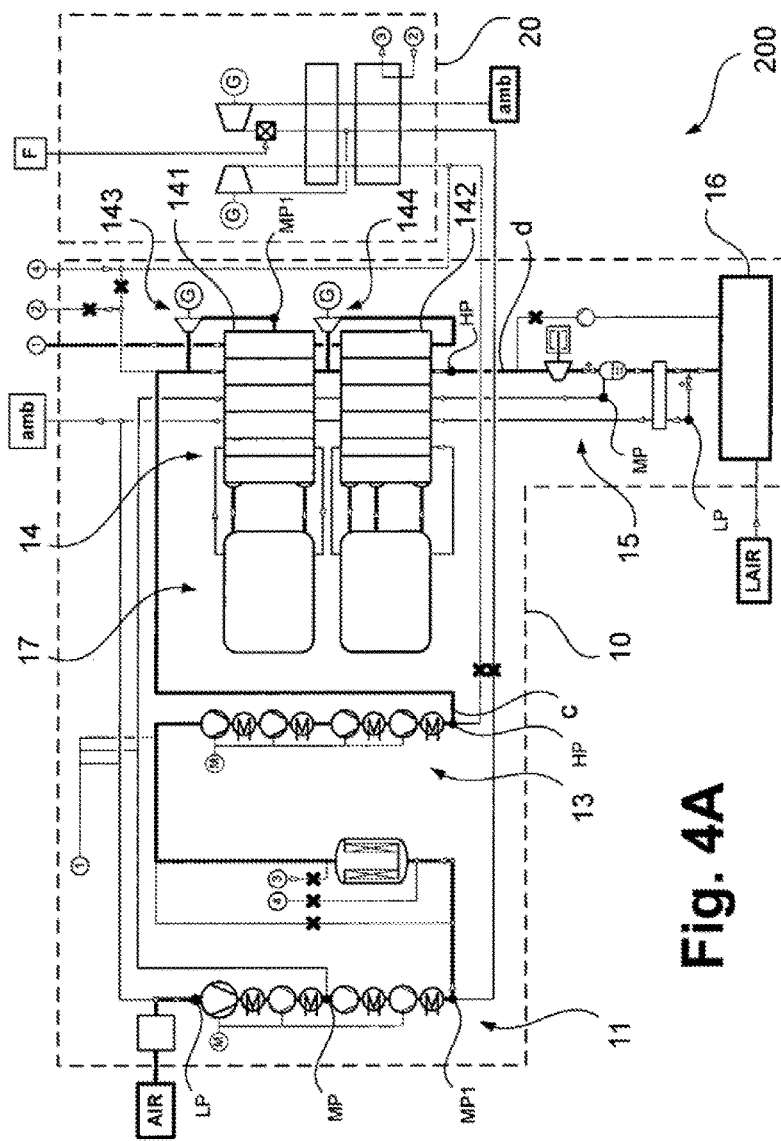
FIG. 4A shows an energy generation plant according to an embodiment of the invention in the first operating mode.
Figure 4B:
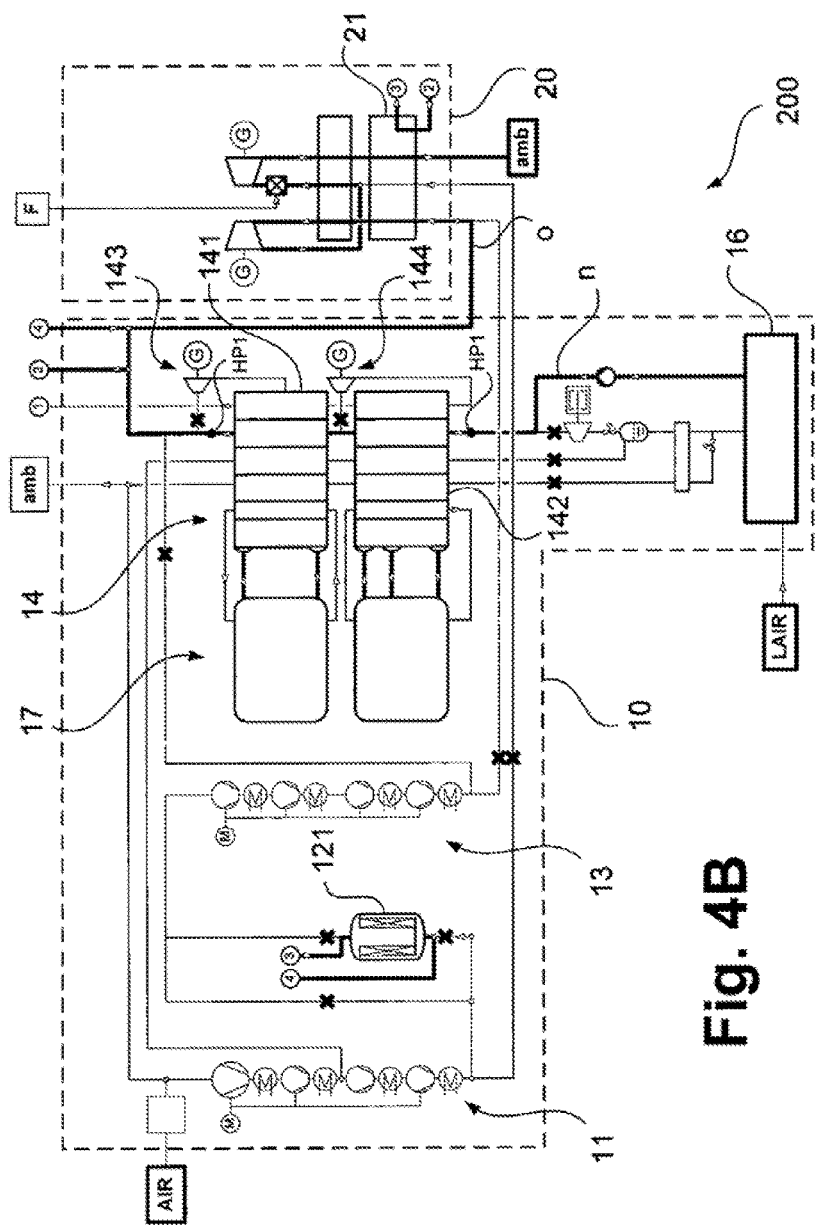
FIG. 4B shows the energy generation plant of FIG. 4A in the second operating mode.
Figure 4C:
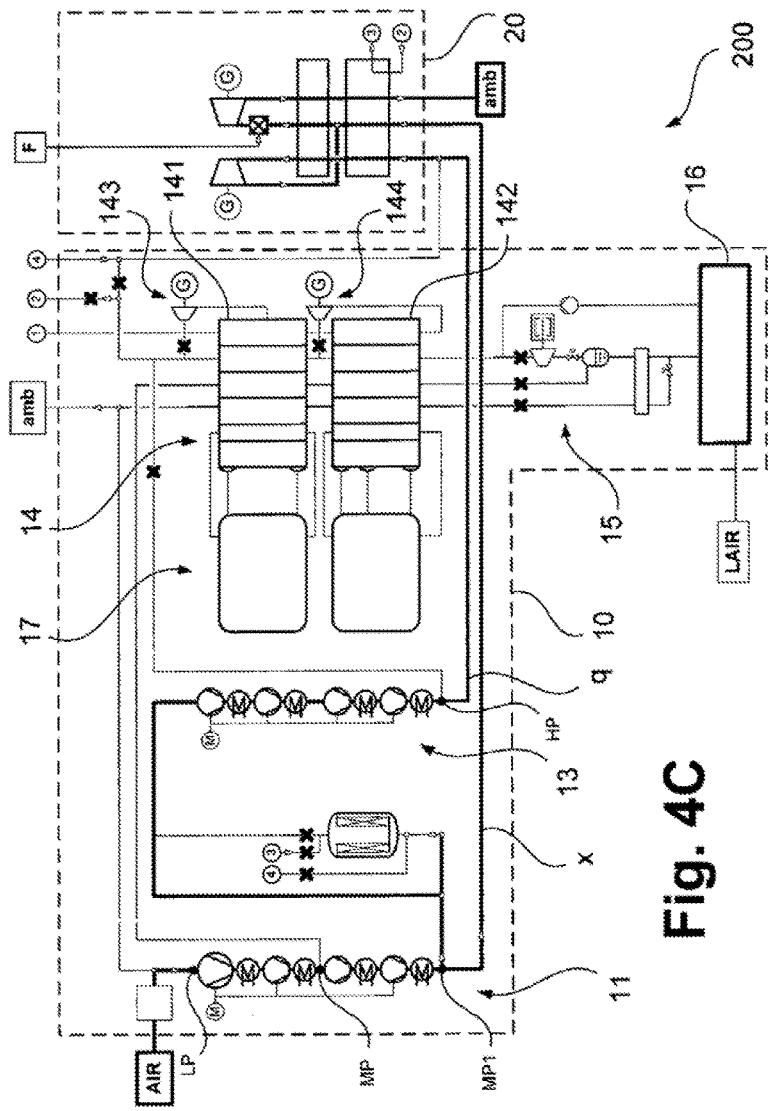
FIG. 4C shows the energy generation plant of FIG. 4A the third operating mode.

In FIGS. 4A to 4C, an energy generation plant according to a further embodiment of the invention is shown schematically and designated overall 200. Here also, FIG. 4A corresponds to the first operating mode, FIG. 4B to the second operating mode and FIG. 4C to the third operating mode. Operation of the energy generation plant 200 corresponds in part to that of the energy generation plant 100, which is shown in FIGS. 1A to 1C. The coolant system 17 can be formed identically to there, and have, for example, the coolant subsystems 171 and 172 that are shown in the previously explained FIGS. 2A to 3B.

The energy generation plant 200 differs substantially from the energy generation plant 100 in that the heat-exchange system 14 additionally has expansion appliances 143 and 144. At these, in each case from stream c, which here is provided in a relatively large amount, substreams can be branched off (without designation). These substreams can be expanded in the expansion appliances 143 and 144 which can have, for example, expansion turbines that are coupled in each case to a generator G. Instead of a generator G, in each case, also an oil brake or another braking appliance can be provided in the expansion appliances 143 and 144.

The substreams are expanded, for example, from the fourth pressure level HP to the third, pressure level MP1. They can be fed to the first heat-exchange block 141 or the second heat-exchange block 142 at the cold end or at an intermediate temperature and correspondingly heated. The heated streams can be combined and fed again upstream to the air treatment unit. The feeding can proceed, for example, in the form of an in feed upstream of the main compressor system 11, at an intermediate site of the main compressor system 11, or upstream of the booster compressor system 13 (cf. link 1). Additional cold can be generated by the additional expansion appliances 143 and 144, whereby a larger amount of feed air AIR can be liquefied by means of the liquefaction system 15. The energy generation plant 200 is therefore better able than the energy generation plant 100 to cover the requirement for air liquefaction product LAIR which is in the second operating mode. An air liquefaction product can equally well be fed externally to the energy generation plant 200.

The second operating mode of the energy generation plant 200 which is shown in FIG. 4B and the third operating mode of the energy generation plant 200 which is shown in FIG. 4C corresponds substantially to the respective operating modes of the energy generation plant 100 (cf. FIGS. 1B and 1C). A repeated explanation is therefore dispensed with. As mentioned, in particular in the second operating mode, which is shown in FIG. 4B, an external feed of air liquefaction product LAIR can be dispensed with. The expansion appliances 143 and 144 are inactive in the second and third operating modes.

Figure 5:
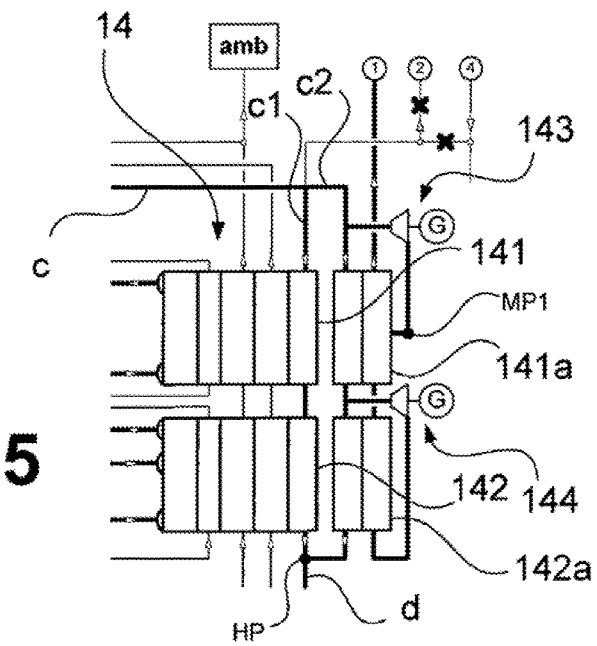
FIG. 5 shows a heat-exchange system according to an embodiment of the invention in the first operating mode.

FIG. 5 shows a further alternative embodiment of a heat-exchange system 14. This can be used as an alternative to the heat-exchange systems 14 shown in FIGS. 1A to 1C and 4A to 4C. In FIG. 5, in this case, the first operating mode is shown. A corresponding heat-exchange system 14 here also has corresponding first and second heat-exchange blocks 141 and 142 which are connected to a coolant system 17 (which is not shown). In parallel to the first heat-exchange block 141 and the second heat-exchange block 142, further heat-exchange blocks 141a and 142a are provided. The stream c in this case can be divided into substreams c1 and c2 and, as shown, can be fed into the first heat-exchange block 141 and the further heat-exchange block 141a. In each case, a substream of the second substream c1 can be expanded in an expansion appliance 143 and 144, for example likewise in an expansion turbine that is coupled to a generator G. The embodiment of the heat-exchange system 14 shown in FIG. 5 therefore differs substantially from the previously explained embodiment, it is shown in FIGS. 4A to 4C that the heat-exchange blocks 141a and 142a are separated lay the heat-exchange blocks 141 and 142.

Figure 6:
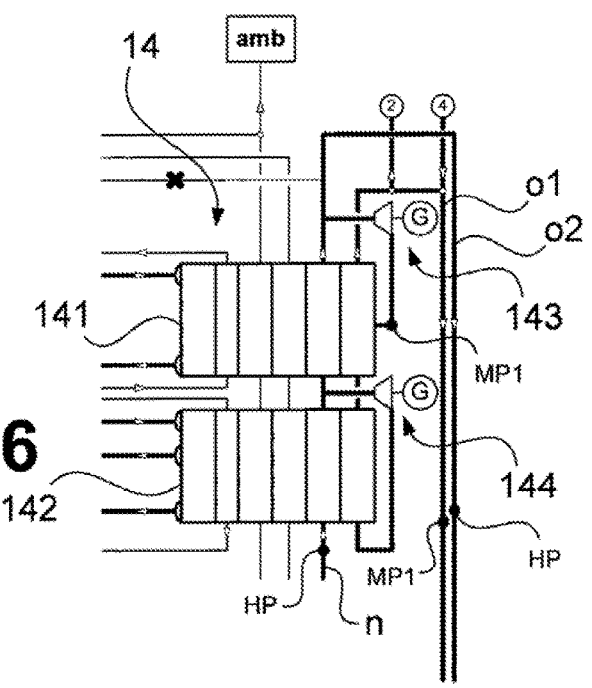
FIG. 6 shows a heat-exchange system according to an embodiment of the invention in the second operating mode.

In FIG. 6, a further embodiment of a heat-exchange system 14 is shown that can likewise be used as an alternative to the above explained possibilities in a corresponding energy generation plant 100 or 200. FIG. 6, however, shows the second operating mode. Here also, expansion appliances 143 and 144 are provided which, however, are operated during this second operating mode. These can also have expansion turbines which can be coupled to corresponding generators G. Substreams of stream n can in this case, before and after heating in the first heat-exchange block 141 and the second heat-exchange block 142, be expanded in the expansion appliances 143 and 144. A stream o1 is formed therefrom. A residual stream o2 is only heated. The streams o1 and o2 can be passed to the power plant unit 20, wherein the stream, o1 can be at the third pressure level MP1 and the stream o2 can be at the fourth pressure level HP. These streams can be fed to the intakes 20a (stream o2) and 20b (stream o1) of the power plant unit 20.

The invention claimed is:

1. A method for generating electrical energy in a combined energy generation plant which comprises an air treatment unit and a power plant unit, wherein:

in a first operating mode, in the air treatment unit, air is successively compressed, cooled and expanded and used for obtaining an air liquefaction product, in a second operating mode, in the air treatment unit, an air liquefaction product is vaporized or pseudo vaporized at superatmospheric pressure and used for obtaining electrical energy in the power plant unit, and in a third operating mode, in the air treatment unit, air is compressed and used in the power plant unit for obtaining electrical energy, characterized in that the air in the first operating mode is successively cooled in counterflow against a first liquid coolant and against a second liquid coolant in a heat-exchange system, and the first coolant is fed to the heat exchange system at a first temperature level and is taken off from the heat exchange system after heating to a second temperature level, and the second coolant is fed to the heat exchange system in part at a third temperature level and in part at a fourth temperature level and is taken off from the heat exchange system after heating to a fifth temperature level, the air liquefaction product in the second operating mode is successively warmed in counterflow against the second coolant and against the first coolant in the heat-exchange system, and the second coolant is fed to the heat exchange system, after cooling, in part at the fourth temperature level and in part at the third temperature level, and the first coolant is fed to the heat exchange system at the second temperature level after cooling to the fifth temperature level the air in the first operating mode is successively compressed from a first pressure level to a second pressure level, to a third pressure level and to a fourth pressure level, the air liquefaction product is warmed in the second operating mode to a fifth pressure level that is beneath the fourth pressure level, and the air is compressed in the third operating mode at a first fraction to the third pressure level and at a second fraction to the fourth pressure level, or the fifth pressure level, wherein the first fraction and the second fraction are introduced separately from one another into the power plant unit.

2. The method as claimed in claim 1, in which propane and/or a low-grade alcohol is used as the first and/or the second coolant.

3. The method as claimed in claim 1, in which two coolant tanks are used for providing the first coolant and three coolant tanks are used for providing the second coolant.

4. The method as claimed in claim 1, in which the second coolant is fed in the first operating mode to the heat-exchange system in the form of substreams at the third temperature level and at the fourth temperature level, and is taken off in the form of a collected stream at the fifth temperature level.

5. The method as claimed in claim 1, in which the second coolant, in the second operating mode, is fed to the heat-exchange system in the form of a collected stream at the fifth temperature level, and taken off at the third temperature level in the form of substreams at the fourth temperature level.

6. The method as claimed in claim 1, in which in each mode a stream of a non-condensing gas is conducted through the heat-exchange system in counterflow to the first coolant and to the second coolant.

7. The method as claimed in claim 1, in which:
the first temperature level is at 20 to 50° C.,
the second temperature level is at −100 to −70° C.,
the third temperature level is at −100 to −70° C.,
the fourth temperature level is at −140 to −100° C.,
the fifth temperature level is at −180 to −150° C.

8. The method as claimed in claim 1, in which:
the first pressure level is at 0 to 2 bar,
the second pressure level is at 4 to 8 bar,
the third pressure level is at 12 to 50 bar,
the fourth pressure level is at 50 to 100 bar, and
the fifth pressure level is at 50 to 100 bar.

9. The method as claimed in claim 8, wherein:
the first pressure level is at 1.4 bar,
the second pressure level is at 5.6 bar,
the third pressure level is at 17 bar,
the fourth pressure level is at 85 bar, and
the fifth pressure level is at 65 bar.

10. The method as claimed in claim 1, in which the air liquefaction product that was warmed under pressure and vaporized or pseudo vaporized in the second operating mode in the air treatment unit is conducted in the power plant unit through a combustion chamber in which a fuel is burnt, wherein an exhaust gas from the combustion chamber is fed at the third pressure level to an expansion turbine that is coupled to a generator.

11. The method as claimed in claim 10, in which the air liquefaction product that was warmed under pressure and vaporized or pseudo vaporized in the second operating mode in the air treatment unit is conducted in the power plant unit, before it is conducted through the combustion chamber is fed having a pressure at the fifth pressure level to a further expansion turbine that is coupled to a generator.

12. The method as claimed in claim 10, in which the exhaust gas of the combustion chamber, after it is expanded in the expansion turbine that is coupled to the generator, is fed to a waste-heat steam generator.

13. The method as claimed in claim 1, in which one of the fractions of the air that were introduced into the power plant unit separately from one another in the third operating mode is boosted in pressure by heating.

14. The method as claimed in claim 13, in which waste heat and/or solar heat is used for the heating.

15. The method as claimed in claim 1, in which the air liquefaction product that was warmed under pressure and vaporized or pseudo vaporized in the second operating mode in the air treatment unit is boosted in pressure by heating in the power plant unit.

16. An energy generation plant for generating electrical energy having an air treatment unit combined with a power plant unit, which air treatment unit comprises a compressor arrangement, a heat-exchange system having a coolant system, a liquefaction system and a tank system and is equipped, in a first operating mode to compress air in the compressor arrangement, to cool the air in the heat-exchange system and to expand the air in the liquefaction system and to use the air for obtaining an air liquefaction product, in a second operating mode to vaporize or pseudo vaporize an air liquefaction product in the heat-exchange system at superatmospheric pressure and to use the air liquefaction product in the power plant unit to obtain electrical energy, and in a third operating mode to compress air in the compressor arrangement and to use the air in the power plant unit to obtain electrical energy, characterized in that the heat exchange system is equipped, to cool the air in the first operating mode successively in counterflow against a first liquid coolant and against a second liquid coolant in the heat-exchange system, by feeding the first coolant to the heat exchange system at a first temperature level and which is taken off from the heat exchange system after the first coolant is heated to a second temperature level, and the second coolant is fed to the heat exchange system in part at a third temperature level and in part at a fourth temperature level and is taken off from the heat exchange system after the second coolant is heated to a fifth temperature level, the heat exchange system warms the air liquefaction product in the second operating mode successively in counterflow against the second coolant and against the first coolant in the heat-exchange system, by feeding the second coolant to the heat exchange system at the fifth temperature level and, after the second coolant is cooled in part at the fourth temperature level in the heat exchange system and in part at the third temperature level the second coolant is taken off from the heat exchange system, and the first coolant is fed at the second temperature level and is taken off from the heat exchange system after the first coolant is cooled to the first temperature level, the compressor arrangement operating to compress the air in the first operating mode in the compressor arrangement successively from a first pressure level to a second pressure level to a third pressure level and to a fourth pressure level, the heat exchange system warming the air liquefaction product in the second operating mode in the heat-exchange system at a fifth pressure level that is below the fourth pressure level, and the compressor arrangement operating to compress the air in the third operating mode in the compressor arrangement at a first fraction to the third pressure level and at a second fraction to the fourth or the fifth pressure level and to introduce the first fraction and the second fraction separately from one another into the power plant unit.

17. The energy generation plant as claimed in claim 16, the power plant unit comprising a generator for generating electrical energy.

* * * * *